United States Patent [19]
Garretson

[11] Patent Number: 5,815,982
[45] Date of Patent: Oct. 6, 1998

[54] AUTOMATIC INSECT TRAP USING INFRARED BEAM OF RADIATION

[76] Inventor: John E. Garretson, 3521 E. Rose La., Paradise Valley, Ariz. 85253

[21] Appl. No.: 749,948

[22] Filed: Nov. 14, 1996

[51] Int. Cl.⁶ .................................................. A01M 1/12
[52] U.S. Cl. .................................. 43/121; 43/111; 43/73
[58] Field of Search .................. 43/64, 65, 107, 43/119, 121, 111, 73, 74

[56] References Cited

U.S. PATENT DOCUMENTS

| | | | |
|---|---|---|---|
| 4,144,668 | 3/1979 | Darncharnjitt | 43/107 |
| 4,411,094 | 10/1983 | Spackova | 43/121 |
| 4,612,724 | 9/1986 | Alboainin | 43/73 |
| 4,641,456 | 2/1987 | Boharski | 43/73 |
| 5,560,146 | 10/1996 | Garro | 43/74 |

*Primary Examiner*—Jack W. Lavinder
*Attorney, Agent, or Firm*—Joseph H. Roediger

[57] ABSTRACT

An automatic insect trap having a gathering chamber removably attached to the top surface of a disposable retention chamber. The gathering chamber includes a bounded passage with an infrared beam of radiation thereacross. The insect interrupts the beam to activate a sweep panel that moves along the passageway to urge the insect to an opening in the retention chamber.

21 Claims, 3 Drawing Sheets

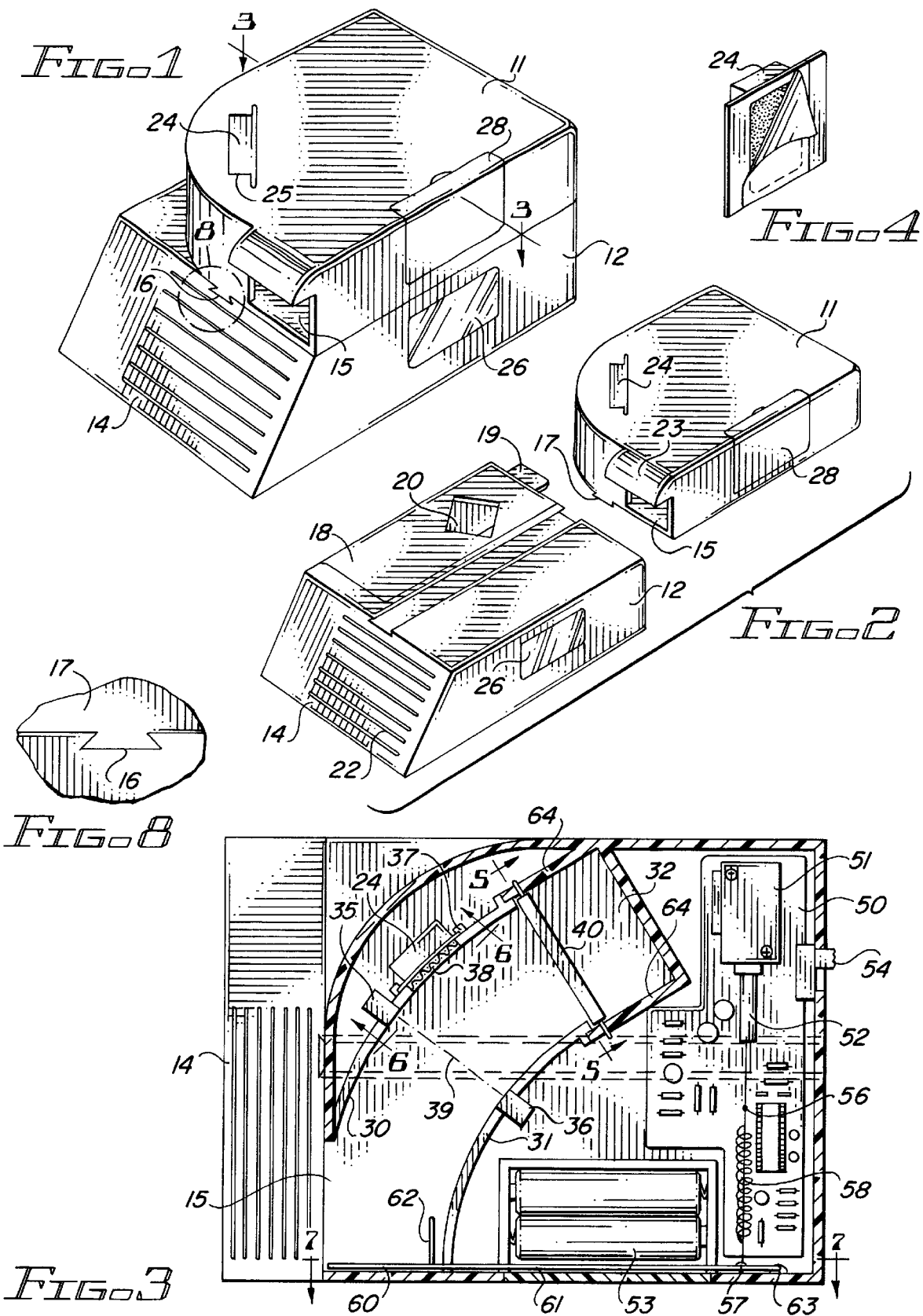

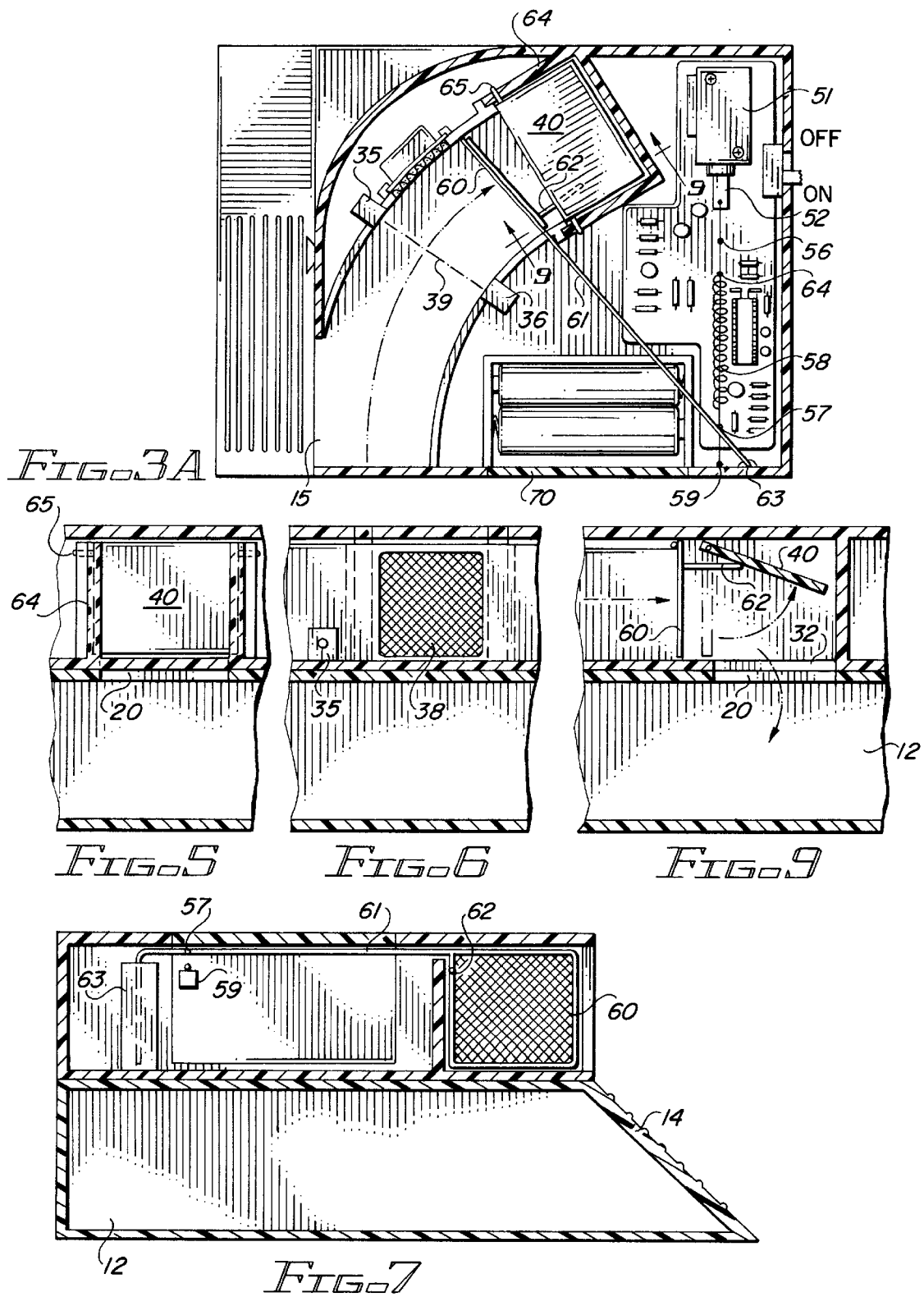

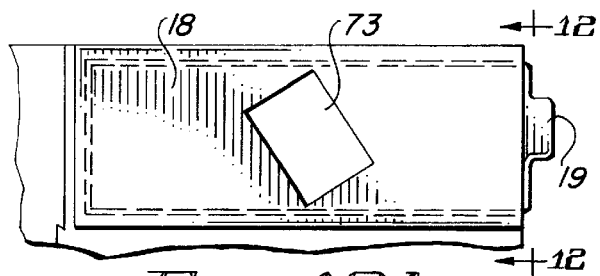
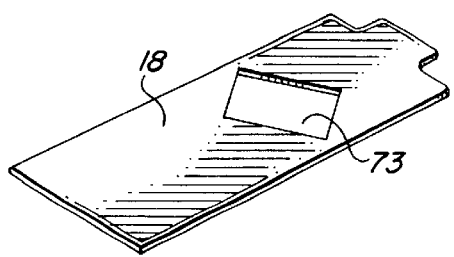
FIG. 10A
FIG. 11
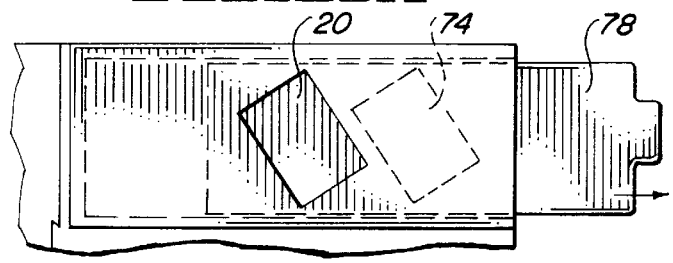
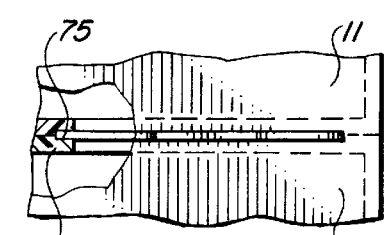
FIG. 10B
FIG. 12
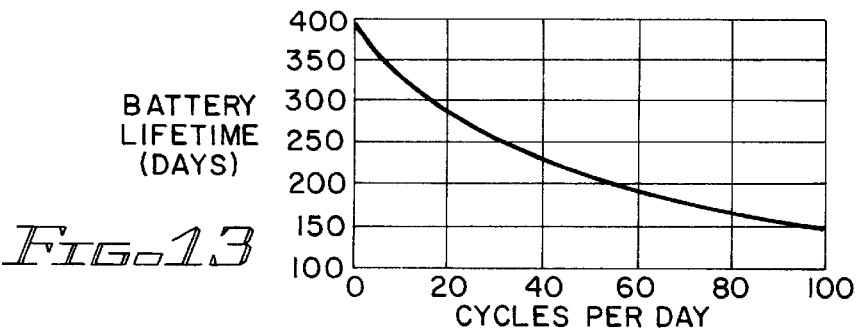
FIG. 13
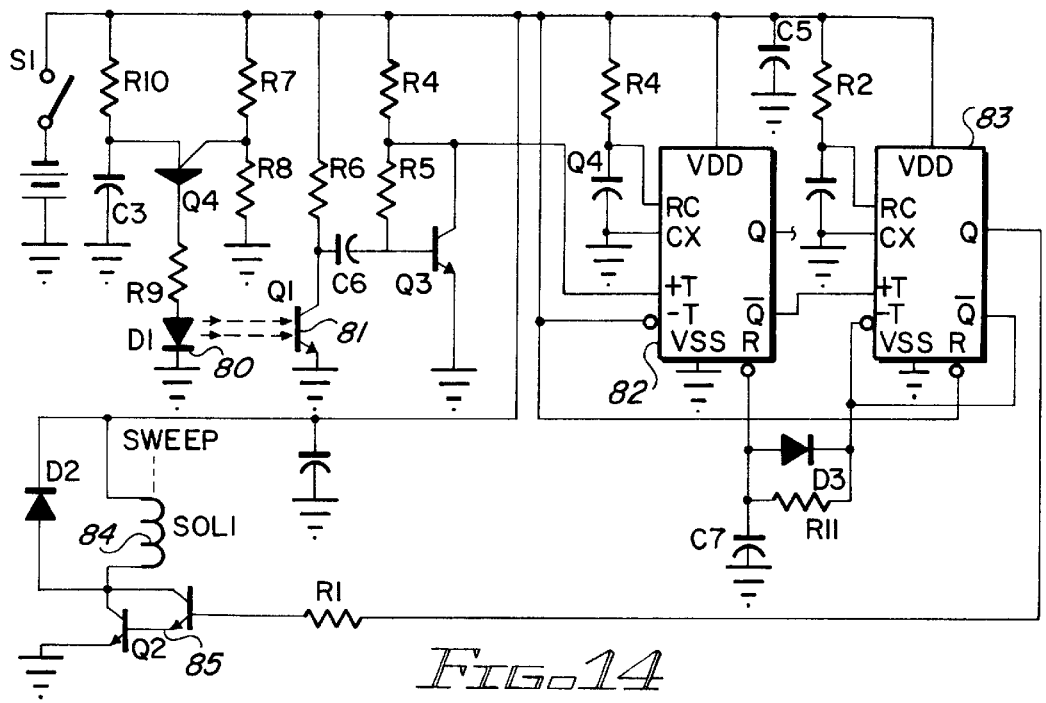
FIG. 14 ized by complexity and high manufacturing cost. As a result, the manufacturer is faced with a number of choices in designing an effective and versatile insect trap.

AUTOMATIC INSECT TRAP USING INFRARED BEAM OF RADIATION

BACKGROUND OF THE INVENTION

This invention relates to automatic insect traps of the type wherein an insect entering the trap interrupts a beam of radiation to trigger a mechanical sweep. The sweep urges the insect along a bounded passageway to an exit port communicating with a retention chamber.

The interest in controlling the insect population in areas inhabited by man has been present as long as history has been recorded. The insect population has survived and, in fact, flourished despite repeated attempts to control it through both chemical and mechanical methods. Today, there is greater public recognition of the dangers inherent in the use of chemical insect control agents and increased attention is being directed to the use of mechanical trapping arrangements for insect control.

In the case of crawling insects, the durable roach existing in several varieties and of different sizes has continued to thrive despite the many attempts to provide a nonchemical approach to reducing the roach population. In many regions of the country, crawling insects commonly referred to as roaches may in fact belong to a variety of different species ranging in size from about one-quarter of an inch to over two inches in size. The variation in size of crawling insects has limited the effectiveness of different trapping mechanisms relying on the body size or body weight of an insect to initiate the action of the trapping mechanism. The sensitivity of the devices used to determine the presence of an insect in the effective area of the trapping device primarily controls whether an insect is to be trapped. Increased sensitivity in insect traps has heretofore been achieved through the use of elaborate electrical sensing devices characterized by complexity and high manufacturing cost. As a result, the manufacturer is faced with a number of choices in designing an effective and versatile insect trap.

One approach to trapping insects is disclosed in U.S. Pat. No. 4,144,668 to Darncharnjitt which utilizes a pair of spaced electrodes formed on a trap door to sense the presence of a roach positioned therebetween. A change in the electrical conditions of a control circuit opens the trap door. Flexible connections are provided for the electrodes on the trap door which rapidly opens and closes to trap the roach. The device is said to repeatedly operate the trap door in the event that the roach is not immediately dislodged from the surface of the trap door. The device utilizes circuitry that provides a low voltage between the exposed electrodes since roaches are stated to be sensitive to electric fields and leave the area if a field is sensed. The device with its exposed electrodes is not suitable for outdoor operation wherein leaves and other airborne matter may be deposited on the electrodes.

This reference discloses an alternative embodiment for trapping roaches which avoids the problems associated with the trap door and exposed electrodes by utilizing an elaborate pattern of concentric electrodes in a container. The electrical circuitry establishes voltages between adjacent electrodes to first sense a roach and then to activate another set of surrounding electrodes carrying line voltage to retain the insect in the container. Both embodiments rely on electrode spacing and the sensing of low voltage to detect the presence of insects.

Another approach to trapping insects is taken in U.S. Pat. No. 4,266,363 to Chen wherein a roach crossing a peddle switch actuates a motor driven push plate to coerce the roach into a separate chamber. The sensitivity of the device relies on detecting a roach crossing exposed spaced electrodes formed on a surface of the switch. A similar device used to trap mice is disclosed in U.S. Pat. No. 4,641,456 to Boharski wherein a mouse contacts adjacently spaced electrodes to trigger a push plate which drives the mouse laterally into an adjacent container. Both devices rely on the sensing of a change in electrical conditions between exposed spaced electrodes to actuate a trapping mechanism.

Accordingly, the present invention is directed to the provision of a novel insect trap which senses the presence of an insect by the use of a beam of radiation positioned within a passageway. The interruption of the beam is independent of the weight or length of the insect. As a result, the present invention is sensitive to the presence of a wide variety of crawling insects. Furthermore, the detection of an insect takes place within a bounded passageway so that sensitivity of the trap is not dependent on the condition of the surrounding environment. Since no electrodes or mechanical parts are open to the environment and the sensing takes place within the darkness of a bounded passageway, the reliability of operation is not significantly affected by ambient conditions.

In order to facilitate the disposal of trapped insects, the present invention includes a gathering chamber removably attached to an underlying retention chamber. The retention chamber can be used as a separate disposal container and readily replaced with a fresh container at the appropriate time. An intermediate closure is movably mounted therebetween to prevent trapped insects from exiting the retention chamber during and after separation of the two chambers.

SUMMARY OF THE INVENTION

The present invention is directed to an automatic trap for insects wherein a gathering chamber for insects is removably attached to the top surface of a retention chamber. The gathering chamber is provided with an entry opening through which insects pass into a bounded passageway. The sensing of the presence of the insect takes place within the passageway.

A pass-through into the retention chamber is located at the inner terminus of the bounded passageway. A mesh panel which is pivotally mounted for movement along the passageway is located proximate to the entry opening in the gathering chamber. The panel is coupled to a drive mechanism which when actuated causes the mesh panel to sweep the bounded passageway from the area near the entry opening to the pass-through whereupon the insect drops into the retention chamber.

The present trap includes means for establishing a beam of radiation which extends across the bounded passageway at a location spaced inwardly from the entry opening. When an insect enters the passageway and encounters the beam, the beam is interrupted and the drive mechanism is actuated. The mesh panel initiates a sweep of the passageway urging the insect therealong to the opening into the retention chamber. To encourage the insect to enter the passageway, a bait may be secured to the wall of the bounded passage at a location beyond the beam of radiation.

Typically, the beam of radiation is located sufficiently distant from the entry opening to cause the insect to be completely within the passageway before encountering the beam. The beam is generated and sensed by the use of a light-emitting diode and complementary photo detector located on opposing sides of the passageway. The frequency of the radiated beam is preferably within the infrared portion of the spectrum since roaches are reported to be relatively insensitive to radiation of this type. Different types of insects may respond to other radiation frequencies thereby requiring use of a beam of radiation residing in a different portion of the spectrum.

The use of a beam of radiation located within a bounded passageway allows the trap to be sensitive to the presence of a wide variety of sizes and species of insects and denies the insect an opportunity to avoid entrapment. The operating environment does not directly affect the sensitivity of the present invention since the sensing of the insect takes place within the bounded passageway. Further features and advantages of the invention will become more readily apparent from the following description of a detailed embodiment when taken in conjunction with the accompanying drawings.

BRIEF DESCRIPTION OF DRAWINGS

FIG. 1 is a view in perspective of one embodiment of the invention.

FIG. 2 is a view in perspective showing separation of the chambers in the embodiment of FIG. 1.

FIGS. 3 and 3A are top views of the embodiment of FIG. 1 taken in the direction of line 3—3 of FIG. 1.

FIG. 4 is a perspective view of an insect bait used in the embodiment of FIG. 1.

FIG. 5 is a partial cross-section view taken along line 5—5 of FIG. 3.

FIG. 6 is a partial cross-section view taken along line 6—6 of FIG. 3.

FIG. 7 is a cross-section view taken along line 7—7 of FIG. 3.

FIG. 8 is an expanded view of the identified portion of FIG. 1.

FIG. 9 is a partial cross-section view taken along line 9—9 of FIG. 3A.

FIGS. 10A and 10B are partial top views of the retention chamber of FIG. 1 showing the positioning of the planar member thereon.

FIG. 11 is a view in perspective of the planar member shown in FIGS. 10A and 10B.

FIG. 12 is a partial cross section taken along line 12—12 of FIG. 10A.

FIG. 13 is a graph showing battery lifetime versus daily operating cycles for the embodiment of FIG. 1.

FIG. 14 is an electrical schematic diagram of the circuit used in the embodiment of FIG. 1.

DESCRIPTION OF THE PREFERRED EMBODIMENT

Referring now to FIG. 1, the automatic insect trap which is the subject of the present invention is shown comprising a gathering chamber 11 situated upon a retention chamber 12. As seen, the chambers are removably attached to form an integral unit during operation. The separation of the gathering chamber 11 from the retention chamber 12 is shown in FIG. 2. The top surface of the retention chamber is provided with a slot or mortise 16 which receives a mating tenon 17 formed in the adjacent bottom surface of the gathering chamber 11. An exploded view of the combination mortise and tenon joint is shown in FIG. 8. The retention chamber and gathering chamber are typically made of molded plastic, and the characteristics thereof permit relatively easy separation of the two chambers. The sensing and trapping operations take place in the gathering chamber 11 which communicates with the retention chamber through access opening 20 in the top surface thereof. The mortise and tenon arrangement shown is but one of many configurations that can be used to provide removable attachment between the adjacent chambers. After a continued lengthy period of operation, it is advisable to dispose of the retention chamber 12 and replace it with a new one. Consequently, the preferred embodiment provides for the separation and the replacement of the retention chamber 12. However, it is to be noted that a single integral unit utilizing the subject invention can be manufactured as well.

The front wall of the retention chamber 12 is shown with an inclined surface. A portion of the surface in general alignment with the entry opening 15 of the gathering chamber is provided with a series of ridges 22 to facilitate movement of a crawling insect upwardly along the front wall 14 into the entry chamber. The use of an inclined front wall and the ridges 22 merely facilitate the movement of the crawling insect thereon to enhance the overall efficiency of the trap. The presence of the inclined front wall 14, the angle thereof and the size and placement of the ridges thereon can be varied in accordance with the particular characteristics of crawling insects in the area of use. Since many insects have no difficulty with vertical walls, trapping takes place even should the front wall 14 be vertical.

The gathering chamber is shown in FIG. 1 as receiving a packaged insect bait 24 in bait slot 25 located in the top surface thereof. The package 24 is seen in FIG. 4 as comprising a conventional blister package of firm plastic with a removable film such as MYLAR forming the planar closure. The bait is typically a ground fish mixture. The rigid flanges of the bait package are received in spaced flanges 37 formed on the outside surface of passageway wall 30 on either side of mesh insert 38. The location of mesh insert 38 in wall 30 is shown in FIG. 6 as being inwardly adjacent to the photo device 35. Also, a battery compartment cover 28 is shown at the opposing edge of the top surface of the gathering chamber. The battery compartment cover is removable to allow access and replacement of the batteries used as power sources. Directly below the cover 28 and formed in the side wall of the retention chamber is a viewing window 26 which permits a visual determination of when the retention chamber is to be replaced.

The interior of the gathering chamber 11 is shown in FIG. 3 where an entry opening 15 is available to an insect traversing front wall 14 of the underlying retention chamber 12. Upon crossing the threshold of opening 15, the insect encounters a bounded passageway shielded from external light. The passageway is formed by opposing side walls 30 and 31 which extend inwardly in an arcuate manner to an exit opening 32. The exit opening is in general alignment with the access opening 20 therebetween as shown FIG. 2. The mortise and tenon joint is shown in dashed lines extending the length of the gathering chamber. The beam of radiation established across the bounded passageway formed between walls 30 and 31 is shown by dashed line 39. The photo sensitive devices, typically a photo diode and a photo detector, establishing an infrared beam are located on the opposing walls of the bounded passageway. The packaged bait 24 is shown positioned behind mesh screen 38 and maintained in position by spaced receiving flanges 37. A movable door 40 is suspended across the passageway between walls 30 and 31 and beyond the door is exit opening 32.

The walls surrounding the exit opening 32 are spaced further apart than the opposing arcuate walls 30 and 31. The door 40, as will later be further explained, moves to permit an insect to be urged into the exit opening of the bounded passageway. However, the door is stopped from returning in the opposing direction beyond vertical by contact with the edges of walls 30 and 31. Thus, the door opens in only one direction to prevent insects from leaving the device via the bounded passageway. The floor of the passageway preferably extends beyond the bottom edge of the door to further impede insect escape.

The suspension of door 40 for rotation about laterally extending hinge pins 65 is shown in FIG. 5. The hinge pins rest in receiving notches formed in walls 64 which bound the exit opening 32 in the gathering chamber. The exit opening is in alignment with access opening 20 of the retention chamber. The walls 64 are spaced to accommodate the movement of the door over the opening. The adjacent walls 30 and 31 of the passageway are more narrowly spaced to prevent movement of the door in the opposing direction. When the sweep is actuated, door opening pin 62 attached to the leading surface of panel 60 contacts the door 40 to cause rotation about the hinge pins.

The gathering chamber also includes a printed circuit board 50 containing the electronic circuit components as well as a solenoid 51 having an armature 52 which is capable of axial movement. An on-off switch 54 controls the energization of the circuitry. The placement of the individual components on the circuit board is a matter for the circuit designer and is not part of the subject invention. Also shown are batteries 53 located beneath the battery compartment cover 28 shown in FIG. 1.

Upon interruption of the beam, the armature 52 of solenoid 51 is withdrawn from the fully extended position of FIG. 3 to the position shown in FIG. 3A. The movement of the armature is used to initiate action of a movable sweep which coerces insects in the bounded passageway through door 40 into exit opening 32. The movable sweep includes a mesh panel 60 dimensioned to fit across the bounded passageway formed by walls 30 and 31. The panel 60 is connected to rod 61 having its opposing end pivotally mounted to the sidewall 70 of the gathering chamber. The pivotal mounting 63 is a molded protuberance formed integral with the sidewall 70 and is provided with a vertical opening therethrough. The rod 61 has its free end formed to project downwardly as shown in FIG. 7.

The rod 61 is directly connected to the armature 52 at securing point 57 by an elongated pin 56 extending therebetween. The withdrawal of the armature into the solenoid causes rotation of rod 61 about the pivotal mounting 63. Approximately midway along pin 56, one end of spring 58 is attached. The opposing end of the spring is connected to sidewall 70 at tie point 59 shown in FIGS. 3A and 7. The tie point is a molded protuberance on the sidewall 70 spaced below the path of rod 61 so as not to interfere with the motion thereof. The free end of the spring is inserted into a hole provided at tie point 59. The return of the sweep comprised of panel 60 and rod 61 to the rest position is provided by the force of spring 58 urging the armature to extend and thereby causing the pin 56 to drive rod 61 back into position adjacent sidewall 70. As an insect enters the bounded passageway and encounters the beam thereacross, the signal produced by the beam interruption causes the solenoid to be activated. The movement of the armature begins the sweep of the bounded passageway to coerce the insect through the door 40 into the underlying retention chamber. The completion of the sweep is accompanied by a relaxation of the flux in the solenoid so that spring 58 promptly urges the sweep to its initial position and the door again assumes the vertical position.

When the retention chamber is sufficiently full, it is separated from the gathering chamber and either emptied or replaced. To facilitate the removal of the retention chamber while it contains live insects, a thin planar member 18 is interposed between the gathering chamber 11 and retention chamber 12 in the region containing the exit opening 32 and access opening 20. The member 18 is shown in FIG. 2 with a tab 19 extending therefrom. In FIG. 11, the planar member 18 is shown more clearly containing an opening 73 oriented in accordance with the orientation of the access opening 20. When in place during operation of the embodiment, the opening 73 is aligned as shown in FIG. 10A. When the separation between gathering and retention chambers are to occur, the tab 19 is grasped and the planar member is pulled over opening 20 as shown in FIG. 10B. The adjacent portions of the surfaces of the gathering and retention chambers is provided with opposing recesses 75 to form flanges 76 to position the planar member for movement along a guided path. This structural feature of the invention enables a changeover of retention chambers to take place without fear of live insects emerging from the used retention chamber.

In one embodiment of the invention tested and operated over an extended period of time and utilizing four commercially-available 1.5v batteries, the battery lifetime for 60 operating cycles each day is projected to be one-half year. A graph of battery lifetime versus the number of sweep cycles per day is shown in FIG. 13. In normal operation, the battery is left on for extended periods so that the present invention is capable of trapping insects throughout the day. As shown from FIG. 13, the need for a battery change-out is determined primarily by the amount of activity in the trap.

The electrical schematic for the circuitry used in the above-described embodiment is shown in FIG. 14 wherein the light emitting diode and phototransistor are QEC122 and QSC112 devices respectively. The solenoid is a Guardian Model 22-1-6D. The paired transistors Q2 coupled to the solenoid are designated MPSW45. The logic circuits utilized in the circuit of FIG. 14 are model MC14538 devices. In operation, the closure of switch S1 provides a current through transistor Q4 and the current therethrough causes light to be emitted by diode D1. The emitted light causes conduction through transistor Q1 until such time as the beam of radiation is interrupted. When so interrupted, the transistor Q1 is non-conductive and the state of transistor Q3 changes. This change is supplied to the logic circuit and the energizing signal therefrom is supplied through paired transistors Q2 which causes the solenoid to be actuated and a sweep of the bounded passageway to be conducted. In the embodiment shown, mechanical means are provided to restore the pivot arm and panel conducting the sweep to its original position adjacent the entry opening. However, it is to be noted that the return could be effected by biasing means located on the armature of the solenoid or, alternatively, a weight attached to the pivot arm so that a gravity return is utilized. A mechanical return of the sweep which is independent of the solenoid as shown in the preferred embodiment is advantageous since the return is independent of the characteristics of the solenoid and thus can be rapidly effected.

While the above description has referred to a preferred embodiment of the invention, it is to be noted that modifications and variations may be made therein without departing from the scope of the invention as claimed.

I claim:

1. An automatic insect trap for placement upon an insect retention chamber, said trap comprising:

a) a bounded gathering chamber having a top member and a base member and having a front wall and side walls extending therebetween, said front wall containing an entry opening to admit insects, said base member containing an exit opening for the passage of insects into an underlying retention chamber;

b) a pair of curved walls located in said gathering chamber and spaced to form an arcuate passageway, one of said curved walls terminating at the front wall and the other of said curved walls terminating at a side wall proximate to the entry opening, said curved walls extending to the exit opening in the base member;

c) a movable sweep dimensioned to fit between said curved walls for movement between the front wall and the exit opening;

d) drive means operatively connected to the movable sweep for moving the sweep along the passageway; and e) means for establishing a beam of radiation across the passageway and providing an actuating signal to the drive means upon interruption of the beam whereby the sweep is caused to urge an insect to the exit opening.

2. The automatic trap for insects in accordance with claim 1 wherein said sweep comprises panel mounted on the end of a pivotally mounted rod, the movement of the rod causes the sweep to move along the arcuate passageway.

3. The automatic trap for insects in accordance with claim 2 wherein said means for establishing a beam of radiation comprises a light emitting element and a light detecting element positioned to establish and sense a beam across said passageway, said elements being spaced from the entry opening.

4. The automatic trap for insects in accordance with claim 3 further comprising a pivotally suspended door located in said passageway adjacent the exit opening.

5. The automatic trap for insects in accordance with claim 4 further comprising a stop located in said passageway to prevent movement of said door away from the exit opening.

6. The automatic trap for insects in accordance with claim 5 further comprising means for receiving an insect bait mounted on said bounded passageway, said means being located between the door and the beam of radiation.

7. The automatic trap for insects in accordance with claim 6 wherein said drive means comprises a solenoid having an armature, the armature being connected to the pivotally mounted rod.

8. The automatic trap for insects in accordance with claim 7 further comprising restoring means coupled to the sweep for returning the sweep to a location adjacent to the entry opening.

9. The automatic trap for insects in accordance with claim 8 wherein said restoring means is a spring tensioned to return the sweep to a position adjacent to the entry opening.

10. The automatic trap for insects in accordance with claim 9 further comprising an access ramp located at the entry opening of the gathering chamber.

11. The automatic trap for insects in accordance with claim 10 further comprising a retention chamber removably attached to the base member of said gathering chamber and having a front wall and a top surface containing an access opening aligned with said exit opening and wherein the ramp is formed in said front wall of the retention chamber.

12. The automatic trap for insects in accordance with claim 11 wherein said retention chamber is opaque.

13. The automatic trap for insects in accordance with claim 11 further comprising a hood attached to the gathering chamber above the entry opening.

14. An automatic trap for insects which comprises:

a) a retention chamber having a front wall and a top surface, said top surface having an opening therein;

b) a bounded passageway located on the top surface of the retention chamber, said passageway including a pair of spaced arcuate walls extending between an entry port and an exit port, said exit port being located adjacent to the opening in the top surface;

c) means for removably attaching the bounded passageway to the retention chamber;

d) a moveable sweep positioned in the passageway adjacent to the entry port for movement therealong;

e) drive means coupled to the sweep for moving said sweep in an arcuate path along the passageway, and f) means for establishing a beam of radiation across the bounded passageway, the interruption of the beam actuating the drive means whereby the sweep urges insects through the exit port to the retention chamber.

15. The automatic trap for insects in accordance with claim 1 further comprising a door movably mounted at the exit port of the passageway.

16. The automatic trap for insects in accordance with claim 15 further comprising a stop mounted at the exit port of the passageway for preventing inward movement of the door.

17. The automatic trap for insects in accordance with claim 16 further comprising a housing for containing the bounded passageway, movable sweep, drive means and means for establishing a beam of radiation, said housing being removably secured to the top surface of the retention chamber.

18. The automatic trap for insects in accordance with claim 17 wherein the front wall of the retention chamber includes a ramp in alignment with the entry opening of the bounded passageway.

19. The automatic trap for insects in accordance with claim 18 further comprising a bait holder attached to the bounded passageway intermediate the beam of radiation and the exit opening.

20. The automatic trap for insects in accordance with claim 17 further comprising a movable planar member interposed between the top surface of the retention chamber and the gathering chamber, said planar member having an opening therein to allow the passage of insects into the retention chamber, movement of the planar member enabling the retention chamber to be sealed upon separation from the gathering chamber.

21. The automatic trap for insects in accordance with claim 20 wherein the movable planar member is provided with a tab which extends outwardly from the retention chamber.

* * * * *